US011489369B2

(12) United States Patent
Narampanawe et al.

(10) Patent No.: US 11,489,369 B2
(45) Date of Patent: Nov. 1, 2022

(54) BATTERY MODULE AND HEARING DEVICE

(71) Applicant: Sivantos Pte. Ltd., Singapore (SG)

(72) Inventors: Nishshanka Bandara Narampanawe, Singapore (SG); Heng Goh Yap, Singapore (SG); Chee Kong Siew, Singapore (SG); Chuan En Andrew Ong, Singapore (SG); Gee Heng Ler, Penang (MY); Sooriya Bandara Rathnayaka Mudiyanselage, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 6 days.

(21) Appl. No.: 17/238,461

(22) Filed: Apr. 23, 2021

(65) Prior Publication Data
US 2021/0336485 A1 Oct. 28, 2021

(30) Foreign Application Priority Data

Apr. 23, 2020 (DE) .......................... 102020205153.4

(51) Int. Cl.
*H04R 25/00* (2006.01)
*H02J 50/12* (2016.01)
(Continued)

(52) U.S. Cl.
CPC ............ *H02J 50/12* (2016.02); *H02J 50/005* (2020.01); *H02J 50/70* (2016.02); *H04R 25/554* (2013.01);
(Continued)

(58) Field of Classification Search
CPC .............. H04R 25/554; H04R 2225/31; H04R 2225/51; H02J 7/02; H02J 50/10; H02J 50/12; H02J 50/70
See application file for complete search history.

(56) References Cited

U.S. PATENT DOCUMENTS 8,174,233 B2 * 5/2012 Julstrom ............... H02J 7/0044
320/108
8,771,852 B2 * 7/2014 Nomura .............. H01M 50/122
429/10
(Continued)

FOREIGN PATENT DOCUMENTS

DE 102017209813 B3 9/2018
DE 102018217468 A1 * 9/2019 .............. H02J 50/10
WO WO-2021070598 A1 * 4/2021

OTHER PUBLICATIONS

"Plastic film capacitor" In: Wikipedia, Processing status: Aug. 10, 2020, URL: https://de.wikipedia.org/wiki/Kunststoff-folienkondensator, accessed on Feb. 19, 2021.
(Continued)

*Primary Examiner* — Ryan Robinson
(74) *Attorney, Agent, or Firm* — Laurence A. Greenberg; Werner H. Stemer; Ralph E. Locher

(57) ABSTRACT

A battery module for a hearing device is configured for inductive resonance charging. The battery module has a secondary cell, a blocking sleeve that encloses the secondary cell and shields the secondary cell against a magnetic field, a jacket formed from permeable material outside the blocking sleeve, and an induction coil outside the jacket for receiving energy inductively. The induction coil and the jacket form a receiving antenna for receiving the energy. The material and/or the geometric structure of the blocking sleeve, the jacket made of permeable material, and/or the induction coil is/are additionally selected in such a way that the battery module, in particular the induction coil, has a quality factor of at least 35 for receiving energy at a predetermined value of a charging frequency that is employed by a charging device that generates a magnetic alternating field.

20 Claims, 3 Drawing Sheets

(51) Int. Cl.
    *H02J 50/70*         (2016.01)
    *H02J 50/00*         (2016.01)

(52) U.S. Cl.
    CPC ....... *H04R 25/602* (2013.01); *H04R 2225/31* (2013.01)

(56) References Cited

U.S. PATENT DOCUMENTS

| | | | |
|---|---|---|---|
| 9,443,648 B2* | 9/2016 | Sawa | H01F 7/0247 |
| 9,812,774 B2* | 11/2017 | Jang | H05K 9/0075 |
| 10,276,900 B2* | 4/2019 | Kawano | H02J 7/02 |
| 10,536,788 B2* | 1/2020 | Nikles | H04R 25/554 |
| 10,893,635 B2* | 1/2021 | Hosotani | H01L 25/07 |
| 11,337,013 B2* | 5/2022 | Nikles | H02J 50/005 |
| 2013/0328524 A1* | 12/2013 | Bartulec | H02J 50/10 320/108 |
| 2014/0091756 A1 | 4/2014 | Ofstein et al. | |
| 2018/0123394 A1* | 5/2018 | Ema | H02J 7/025 |
| 2019/0348863 A1* | 11/2019 | De Masi | H02J 50/70 |

OTHER PUBLICATIONS

"Button Cell" In: Wikipedia, Processing Status Oct. 30, 2020, URL: https://de.wikipedia.org/wiki/knopfzelle, accessed on Nov. 10, 2020.
Fofanov, D. et al.: "Magnetische eigenschaften nichtrostender Staehle" [Magnetic properties of stainless steels], Leaflet 827, Edition 2013, URL: https://www.edelstahl-rostfrei.de/fileadmin/user_upload/ISER/downloads/MB_827.pdf, [retrieved Nov. 10, 2020]—English abstract.

* cited by examiner

BATTERY MODULE AND HEARING DEVICE

CROSS-REFERENCE TO RELATED APPLICATION

This application claims the priority, under 35 U.S.C. § 119, of German patent application DE 10 2020 205 153.4, filed Apr. 23, 2020; the prior application is herewith incorporated by reference in its entirety.

BACKGROUND OF THE INVENTION

Field of the Invention

The invention relates to a battery module. Furthermore, the invention relates to a hearing device having such a battery module.

Hearing devices are typically used to output an audio signal to the sense of hearing of the wearer of this hearing device. The output is effected by way of an output transducer, usually acoustically via airborne sound by means of a loudspeaker (also referred to as a "receiver"). Such hearing devices are frequently used as so-called hearing aid devices (also in short: hearing aids), which are used for the treatment of a person having a hearing loss. For this purpose, the hearing devices normally comprise an acoustic input transducer (in particular a microphone) and a signal processor, which is configured to process the input signal (also: microphone signal) generated by the input transducer from the ambient sound with application of at least one typically user-specific stored signal processing algorithm in such a way that the hearing loss of the wearer of the hearing device is at least partially compensated for. In particular in the case of a hearing aid device, the output transducer can be, in addition to a loudspeaker, alternatively also a so-called bone vibrator or a cochlear implant, which are configured for mechanical or electrical coupling of the sound signal into the sense of hearing of the wearer. The term "hearing device" additionally includes in particular devices, e.g., so-called tinnitus maskers, headsets, headphones, and the like.

Rechargeable energy accumulators (in particular in the form of secondary cells, also referred to as "accumulators") have been used more and more for the power supply of the electronic components of the hearing device. It is fundamentally conceivable to replace conventional battery formats with identical-format secondary cells. However, since the latter usually output other voltage values, a converter electronics unit for voltage conversion to the voltage values required by the electronic components is generally necessary, so that a simple, straightforward exchange is usually not possible. Moreover, it is to be possible to recharge the secondary cells even without removing them from the corresponding hearing device, in order to increase the convenience of use. Since hearing devices, in particular hearing aid devices, are generally worn on the body and are thus subjected to bodily fluids, in particular sweat, wireless charging is additionally desirable. This is because in this way the housing of the hearing device can be made particularly leak-tight.

Wireless charging typically takes place by way of an inductive charging coil (also: "secondary coil"), which is coupled wirelessly, specifically inductively, in charging operation with an emitting coil (also: "primary coil") arranged in a charging device. In this case, however—possibly in addition to the above-described converter electronics unit (if the electronic components are not adapted with respect to their operating voltage value to the output voltage of the secondary cell)—a charging electronics unit is required for controlling the (cell-side) charging procedure. This is usually combined jointly with the secondary cell to form a "battery module."

For inductive charging, a comparatively precise arrangement of the charging coil in relation to the emitting coil is required. Furthermore, the two coils also have to be arranged at a comparatively short distance to one another (usually in the range of approximately 3 mm). Otherwise, the possible energy yield during the energy transfer is impaired, which results in long charging cycles or even in inadequate or at worst impossible charging of the secondary coil. In particular in the case of hearing devices to be worn in the ear (in particular in the case of so-called "in the ear hearing aid devices," also referred to in short as ITE), such a precise or close arrangement in relation to one another is usually not possible, however, for example due to frequently individually adapted housings.

BRIEF SUMMARY OF THE INVENTION

It is accordingly an object of the invention to provide a novel battery module and a hearing device which overcome a variety of disadvantages of the heretofore-known devices and methods of this general type and which provides for improved wireless charging.

With the above and other objects in view there is provided, in accordance with the invention, a battery module for a hearing device, the battery module comprising:

a secondary cell;

a blocking sleeve enclosing said secondary cell and configured to shield said secondary cell against a magnetic field;

a jacket formed from permeable material and arranged on an outside of said blocking sleeve; and an induction coil arranged on an outside of said jacket and configured to receive energy inductively, with said induction coil forming a receiving antenna with said jacket for receiving energy;

wherein a material and/or a geometric structure of at least one of said blocking sleeve, said jacket formed of permeable material, or said induction coil is selected to adjust a quality factor of at least 35 in the battery module for receiving energy at a predetermined charging frequency of a magnetic alternating field generated by a charging device for charging the battery module by inductive resonance charging.

In other words, the battery module according to the invention is configured and provided for use in a hearing device, in particular a hearing aid device (in short: "hearing aid"), optionally in an ITE hearing aid device (i.e., in a hearing aid device to be worn in the ear, referred to in short as "ITE"). Similarly, the battery module according to the invention is also suitable, however, for use in a hearing aid device to be worn behind the ear (also: "BTE" for "behind the ear") and is also configured and provided for this purpose. Moreover, the battery module is configured for the purpose of being used in an inductive (or also "magnetic") resonance charging method.

For this purpose, the battery module according to the invention comprises (i.e., contains or includes) a secondary cell, a blocking sleeve (or, blocking jacket), which encloses the secondary cell and is used to shield the secondary cell against a magnetic field, a jacket which is formed from permeable material and is arranged on the outside of the blocking jacket, and an induction coil, which is arranged on the outside of the jacket and is configured for receiving energy inductively, and which forms at least with the jacket made of permeable material—and also optionally additionally together with the blocking jacket—a receiving antenna for receiving energy. The material and/or the geometrical structure of the blocking jacket, the jacket made of permeable material, and/or the induction coil is selected in such a way that the battery module, in particular the induction coil for receiving energy, has a quality factor of greater than 35, preferably of at least 45, at a predetermined value of a charging frequency which is used by a charging device during the generation of a magnetic alternating field.

Preferably, the blocking sleeve or blocking jacket encloses the secondary cell in a manner closed in a ring shape at least on its lateral surface.

Such a high quality factor enables a resonant coupling of the receiving antenna, in particular thus the induction coil, with a corresponding emitting coil of the charging device. This in turn enables the induction coil to be able to be aligned comparatively imprecisely in relation to the emitting coil, for example in an inclined position of up to 60° (in particular with respect to the axes of the two coils) and/or at a distance of up to 20 mm. Furthermore, an energy efficiency which is at least approximately twice as high as conventional inductive energy transfer is possible.

The term "BTE" includes here and hereinafter in particular both hearing aid devices which have a loudspeaker in the housing and conduct the sound by means of a sound tube to the sense of hearing of the user ("hearing aid wearer"), thus also hearing aid devices which have a loudspeaker outside the housing, positioned in the auditory canal in the intended worn state (also referred to as "RIC-BTE" or the like for "receiver in canal").

In one preferred embodiment, the receiving antenna, in particular the induction coil, is tuned to a resonance frequency of greater than 11 MHz, preferably around 13.56 MHz (preferably with the tolerance of approximately 1 to at most 5%). In other words, the predetermined value of the charging frequency is greater than 11, preferably around 13.56 MHz, or precisely 13.56 MHz. This resonance frequency (or charging frequency) is particularly advantageous, for example, if a further coil operating according to the inductive transfer principle, for example a data transfer coil or a telephone coil is provided in a device comprising the battery module, in particular the hearing device, which preferably operates in a different frequency range (for example at approximately 3 or approximately 10 MHz). In such a case, the risk of mutual influencing of the two coils is reduced.

In a further preferred embodiment, the material and/or the structure (for example the material thickness) of the jacket made of permeable material is selected in such a way that it (i.e., the jacket) has a loss factor of less than 0.03, preferably of less than 0.02, at the predetermined value of the charging frequency. In particular, for this purpose the target value of the (in particular magnetic) loss factor ("tanδ"; also referred to in English as "magnetic loss tangent") for the material is determined as a function of the preferred value (or also: "target value") of the quality factor ("Q") on the basis of the formula $$\tan\delta = \frac{1}{Q} \quad (1)$$

For a specific material, the loss factor is determined on the basis of the formula $$\tan\delta = \frac{\mu''}{\mu'} \quad (2)$$

wherein $\mu''$ stands for the imaginary part of the (complex) coefficient of permeability (or also: the "relative permeability") and $\mu'$ stands for the real part of the coefficient of permeability.

In one expedient refinement, the jacket made of permeable material is formed from a ferrite or contains a ferrite. In the first case, the jacket is, for example sintered. In the second case, the jacket is, for example injection molded from a ferrite-filled plastic. However, the jacket is preferably formed from a flexible (and preferably multilayer) film, which contains ferrite particles.

In one preferred embodiment, a number of turns and a line cross-sectional area are selected for the induction coil as a geometric structure as a function of a dimension, preferably of the diameter of the secondary cell. The number of turns and the diameter of the secondary cell (therefore also the diameter of the induction coil) influence the inductance of the induction coil. On the other hand, each turn of the line forming the induction coil also results in an increase of its length, which in turn results in an increase of the resistance of the induction coil. Since the quality factor with regard to the induction coil itself is described by $$Q = \frac{\omega L}{R} \quad (3)$$

wherein $\omega$ describes the angular frequency of the resonance frequency, L describes the inductance, and R describes the (in particular alternating current) resistance of the induction coil, and the resistance is in turn dependent on the length and the cross-sectional area of the corresponding line, a high number of turns results in a comparatively minor improvement or even worsening of the quality factor. For a secondary cell which preferably corresponds with respect to its diameter to typical hearing aid batteries, for example of a "type" 312, for example, a number of turns of two is used. Copper is preferably used as the material of the induction coil. Copper has the advantage of a particularly low specific resistance, and also in particular a minor temperature-related change of the resistance.

In one expedient embodiment, the induction coil is arranged in the middle region (viewed with respect to the thickness or height of the secondary cell) of the battery module, in particular of the secondary cell or of the jacket made of permeable material.

In a further expedient embodiment, the induction coil is coupled to a resonance capacitor for setting the resonance frequency of the receiving antenna. The resonance capacitor preferably has a dielectric absorption (in particular a type of residual voltage or voltage "charged" again in the capacitor after the discharge) having an amount of less than 0.5, preferably less than 0.3%, a tolerance of 1% or less, and/or a voltage nominal value of 50 V. Furthermore, the capacitance C of the resonance capacitor is preferably determined on the basis of the equation for the angular frequency w of a passive component $$\omega = \frac{1}{\sqrt{LC}} \qquad (4)$$

at the predetermined angular frequency w and predetermined inductance L of the induction coil. Since the most precise possible matching of the resonance frequency (which corresponds to the above-mentioned angular frequency) is required for the inductive resonance charging method, the resonance frequency of the receiving antenna can also be set particularly precisely using a high precision resonance capacitor which fulfills at least one, preferably all of the above-mentioned criteria.

In one preferred embodiment, the material of the blocking jacket is selected in such a way that the coefficient of permeability of the blocking jacket is less by at least two, preferably three orders of magnitude than the coefficient of permeability of a housing material of the secondary cell. In particular, copper is selected as the material of the blocking jacket. This is advantageous in particular insofar as the housing material of the secondary cell is usually stainless steel, the coefficient of permeability of which is approximately in the range between 750 and 1800. In contrast, the coefficient of permeability of copper is approximately in the range of 1. Eddy current losses in the secondary cell and thus also its heating can advantageously be reduced by the blocking jacket, in particular having the above-mentioned properties. The thickness of the blocking jacket is preferably determined for this purpose, in particular on the basis of the following formula $$P = \frac{\pi^2 B_p^2 d^2 f^2}{6k\rho D}. \qquad (5)$$

In this formula (5):
P describes the power losses,
$B_p$ describes the magnetic field peak,
d describes the thickness of the blocking sleeve or blocking jacket (or the diameter of a wire),
f describes the (resonance) frequency,
k describes a constant with the amount 1 for a thin layer and 2 for a thin wire,
$\rho$ describes the specific resistance of the material, and
D describes the density of the material.

For example, a value of at least 0.08, preferably of 0.10 mm or up to 0.12 mm is used as the thickness of the blocking jacket. In other words, the blocking jacket is a foil, in particular a copper foil. This is preferably cut as a strip and laid with its ends overlapping one another to form the above-described ring. The thickness of the blocking jacket is preferably selected here in such a way that a fourfold conductive layer thickness (also: "skin depth")—which corresponds to a thickness or depth at which the penetration depth of the (electro) magnetic field has dropped to 37%—is present. It is thus advantageously made possible that only approximately 2% of the field can penetrate to the secondary cell and can induce eddy currents there.

In one expedient embodiment, the induction coil is designed as a wire coil (i.e., made of a solid wire) or as a braided coil (i.e., made of a plurality of comparatively thin individual wires, also "filaments"). The number of windings is preferably two. Furthermore, the wire or the braid is preferably at least externally insulated, so that a short-circuit between the windings can be suppressed.

In an alternative embodiment, the induction coil is formed as a conductor track of a flexible printed circuit board. The number of windings of the induction coil is preferably also two in this variant. In particular, the induction coil is formed by two or more conductor track sections. After the flexible printed circuit board has been laid around the secondary cell, these conductor track sections are preferably galvanically contacted, for example soldered or welded.

The hearing device according to the invention comprises the above-described battery module. The hearing device is preferably designed as a hearing aid device (in particular to be worn behind the ear).

The conjunction "and/or" is to be understood here and hereinafter in particular in such a way that the features linked by means of this conjunction can be formed both jointly and also individually and alternatively to one another.

Other features which are considered as characteristic for the invention are set forth in the appended claims.

Although the invention is illustrated and described herein as embodied in a battery module and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts and elements that corresponds to one another are provided with the same reference signs throughout the figures.

DETAILED DESCRIPTION OF THE INVENTION

Figure 1:
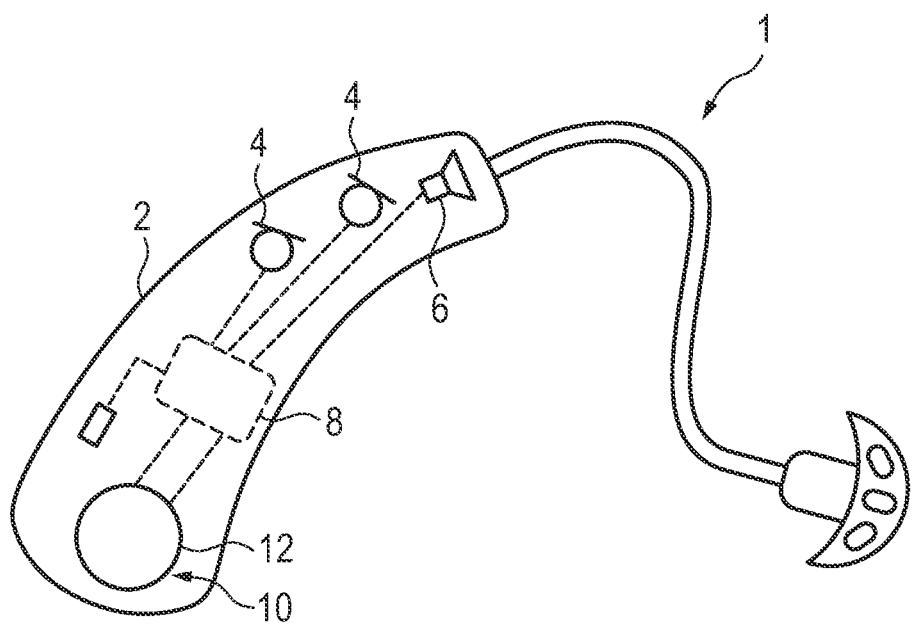
FIG. 1 shows a schematic side view of a hearing device.

Referring now to the figures of the drawing in detail and first, in particular, to FIG. 1 thereof, there is shown a hearing device in the form of a hearing aid device, specifically a hearing aid device (abbreviated: "BTE 1") to be worn behind the ear of a user. It should be understood that the hearing device can similarly also be designed as a hearing aid device ("ITE") to be worn in the ear. The BTE 1 comprises a housing 2, in which electronic components of the BTE 1 are arranged. These electronic components are, for example, two microphones 4, a loudspeaker 6, a signal processor 8, and a battery module 10. The microphones 4 are used in the intended operation of the BTE 1 for receiving ambient sound and converting it into electrical input signals, which are processed (in particular filtered, amplified and/or damped depending on frequency, etc.) by the signal processor 8. The processed input signals are subsequently output as output signals at the loudspeaker 6 and converted thereby into sound signals and relayed to the sense of hearing of the user.

Figure 2:
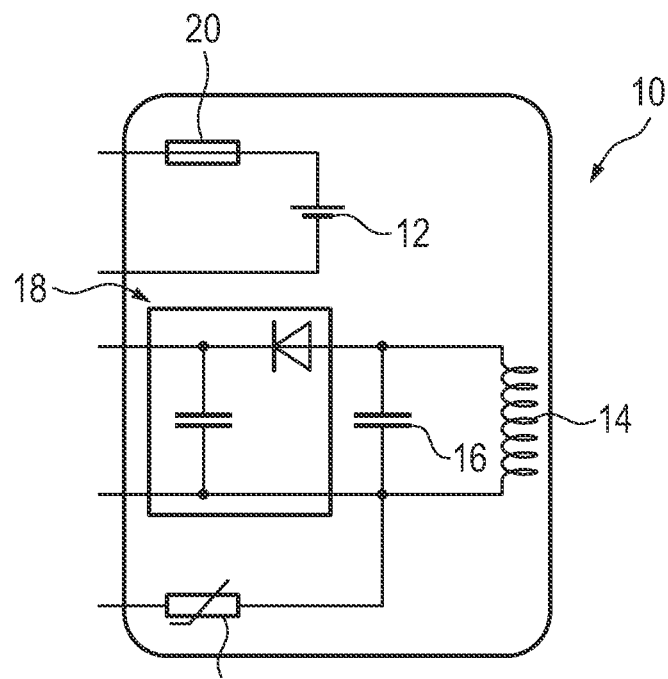
FIG. 2 shows a schematic circuit diagram of a battery module of the hearing device.

The energy required for operating the electronic components is provided in intended operation by the battery module 10. The battery module 10 comprises, as an energy accumulator, a rechargeable battery 12 (also referred to as a "secondary cell"). So as not to have to remove the battery 12 from the housing 2 for charging and to make the charging as convenient as possible, the battery module 10 is configured for wireless charging. For this purpose, the battery module 10 comprises an induction coil 14 (see FIG. 2), to be able to receive inductive charging energy, which is emitted by a charging coil (also referred to as a primary coil). To enable the highest possible energy yield and the highest possible tolerance in the alignment of the induction coil 14 in relation to the primary coil, the battery module 10 is configured and provided for a so-called inductive or magnetic resonance charging method. For this purpose, the battery module 10 comprises a resonance capacitor 16, which is interconnected directly (i.e., without further components interposed) with the induction coil 14. This resonance capacitor 16 is selected in such a way that a resonance frequency of the induction coil 14 is tuned to the narrowest possible frequency band. In the present exemplary embodiment, a frequency of 13.56 Megahertz is selected as the resonance frequency.

In the present exemplary embodiment, the battery module 10 additionally has a rectifier circuit 18, a fuse 20 interconnected with the battery 12, and a thermistor 22 for thermal monitoring of the battery 12 during a charging procedure. The battery module 10 optionally also has a charging electronics unit, which feeds the energy into the battery 12 and monitors the charging and discharging procedures during the charging procedure.

Figure 3:
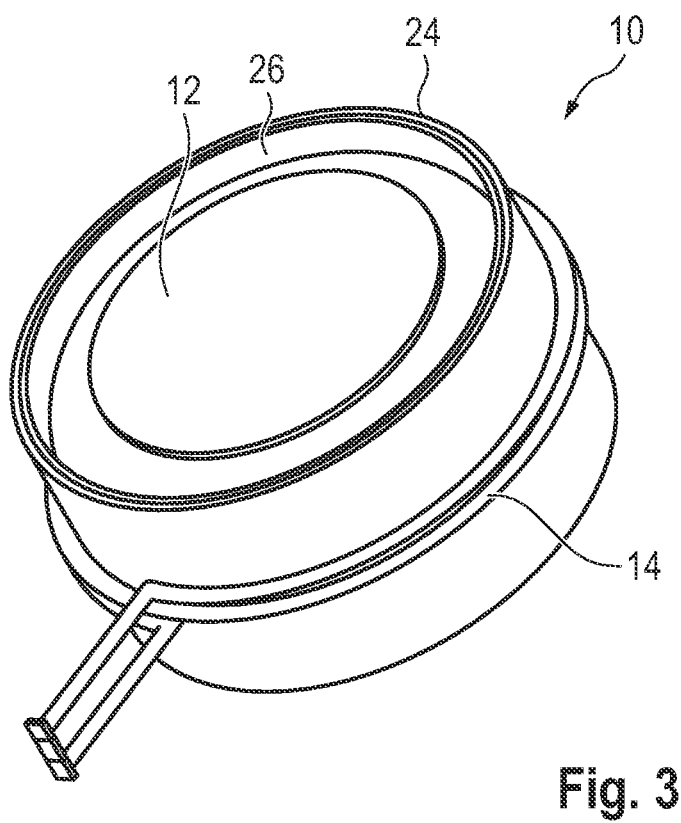
FIG. 3 shows a schematic perspective illustration of the battery module.

A part of the battery module 10 is shown in greater detail in FIG. 3. It can be seen from this that the induction coil 14 is laid around the circumference of the battery 12, which is in the form of a button cell. Below the induction coil 14, i.e., between the battery 12 and the induction coil 14, there is arranged a jacket 24 made of permeable material. The jacket 24 is used for conducting magnetic field lines that originate from the primary coil. The jacket 24 is formed by a ferrite-containing film, which is laid as a ring jacket around the battery 12. In the present exemplary embodiment, the film of the TDK Corporation sold under the designation IFL04 having a thickness of 0.2 mm is used as the film. This enables a loss factor of less than 0.03 at the selected resonance frequency and thus a quality factor of approximately 40 for the induction coil 14, specifically for the receiving antenna formed by the induction coil 14 and the jacket 24. A further jacket, denoted as a "blocking sleeve 26" or "blocking jacket 26," is laid closed in the form of a ring around the battery 12 below the jacket 24. This blocking sleeve 26 is formed from copper and is used to reduce or prevent eddy current losses in the housing material of the battery 12, which can occur due to magnetic fields coupling into the housing material of the battery 12.

In the present exemplary embodiment, the battery 12 has dimensions which correspond to a button cell of the type 312. A number of turns of the induction coil 14 is set to two for these dimensions, since in this case a good ratio of inductance and resistance of the induction coil 14 results. Copper is selected here as the material of the induction coil 14.

Figure 4:
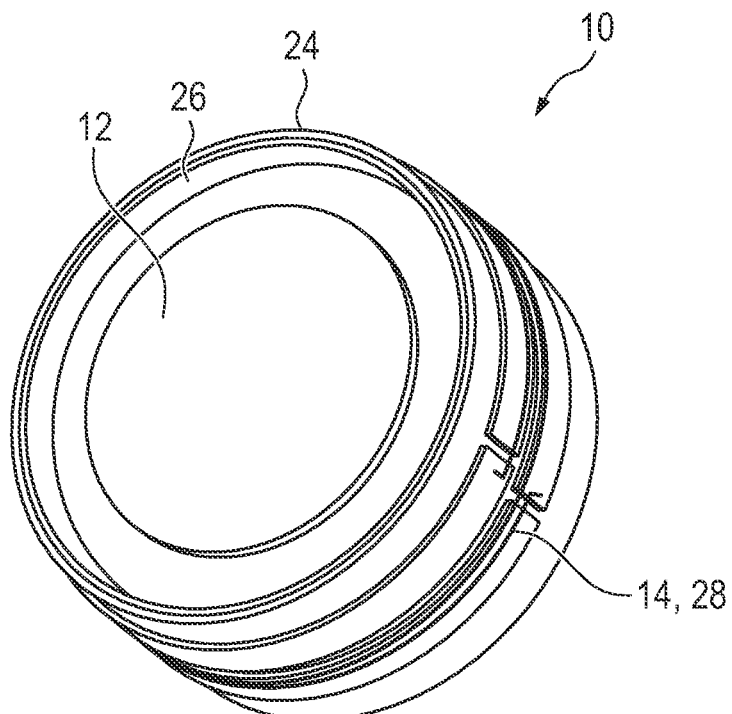
FIG. 4 shows a further exemplary embodiment of the battery module in a view according to FIG. 3.
Figure 5:
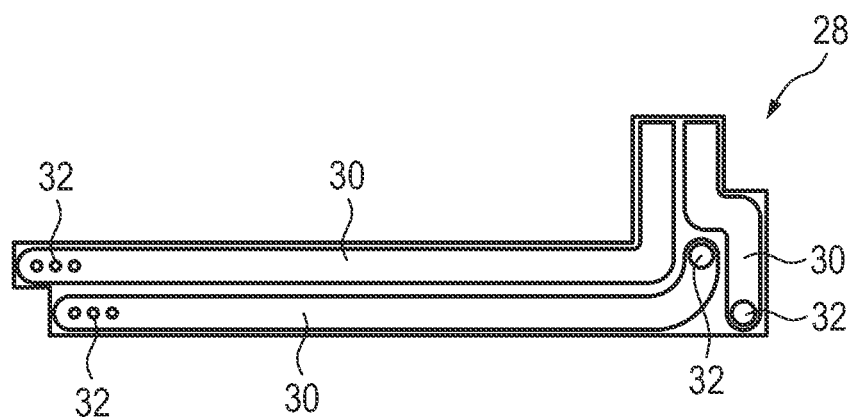
FIG. 5 shows a schematic top view of an induction coil of the battery module according to FIG. 4 in an intermediate manufacturing step.

In the exemplary embodiment according to FIG. 3, the induction coil 14 is formed as a wire coil. In an alternative exemplary embodiment, shown in FIG. 4, the structure of which fundamentally corresponds to that of the exemplary embodiment according to FIG. 3, in contrast, the induction coil 14 is formed as a conductor track of a flexible printed circuit board 28 ("flex PCB"). This is firstly produced, as shown in FIG. 5, as a flat "unwound" element having multiple—three in the illustrated case—conductor track sections 30, which are galvanically connected to one another at corresponding connecting points 32 after the printed circuit board 28 is wrapped around the battery 12.

Independently of the embodiment of the induction coil 14, it is arranged centrally with respect to the thickness of the battery 12 or the width of the jacket 24, in order to be located here in the region of the concentrated magnetic field lines.

The subject matter of the invention is not restricted to the above-described exemplary embodiments. Rather, further embodiments of the invention can be derived by a person skilled in the art from the above description. In particular, the individual features of the invention described on the basis of the various exemplary embodiments and their design variants can also be combined with one another in another way.

The following is a summary list of reference numerals and the corresponding structure used in the above description of the invention:

1 BTE
2 housing
4 microphone
6 loudspeaker
8 signal processor
10 battery module
12 battery
14 induction coil
16 resonance capacitor
18 rectifier circuit
20 fuse
22 thermistor
24 jacket
26 blocking sleeve, blocking jacket
28 printed circuit board
30 conductor track section
32 connecting point

The invention claimed is:

1. A battery module for a hearing device, the battery module comprising:
a secondary cell;
a blocking sleeve enclosing said secondary cell and configured to shield said secondary cell against a magnetic field;
a jacket formed from permeable material and arranged on an outside of said blocking sleeve; and
an induction coil arranged on an outside of said jacket and configured to receive energy inductively, with said induction coil forming a receiving antenna with said jacket for receiving energy;
wherein a material and/or a geometric structure of at least one of said blocking sleeve, said jacket formed of permeable material, or said induction coil is selected to adjust a quality factor of at least 35 in the battery module for receiving energy at a predetermined charging frequency of a magnetic alternating field generated by a charging device for charging the battery module by inductive resonance charging.

2. The battery module according to claim 1, wherein said induction coil has a quality factor of at least 35.

3. The battery module according to claim 1, wherein said receiving antenna is tuned to a resonance frequency of greater than 11 MHz.

4. The battery module according to claim 3, wherein said receiving antenna is tuned to a resonance frequency of 13.56 MHz.

5. The battery module according to claim 1, wherein the material or the structure of said jacket formed of permeable material is selected to define a loss factor of less than 0.03 at the predetermined value of the charging frequency.

6. The battery module according to claim 5, wherein the loss factor is less than 0.02.

7. The battery module according to claim 5, wherein said jacket formed of permeable material is formed from a ferrite or contains a ferrite.

8. The battery module according to claim 1, wherein said induction coil has a number of turns and a line cross-sectional area selected as a function of a dimension of said secondary cell.

9. The battery module according to claim 8, wherein the material of said induction coil is copper.

10. The battery module according to claim 1, further comprising a resonance capacitor coupled to said induction coil for setting a resonance frequency of said receiving antenna.

11. The battery module according to claim 10, wherein said resonance capacitor has a dielectric absorption of less than 0.5, a tolerance of 1%, and/or a voltage nominal value of 50 V.

12. The battery module according to claim 11, wherein said resonance capacitor has a dielectric absorption of less than 0.3.

13. The battery module according to claim 1, wherein the material of said blocking sleeve is selected to form said blocking sleeve with a coefficient of permeability being less by at least two orders of magnitude than a coefficient of permeability of a housing material of said secondary cell.

14. The battery module according to claim 13, wherein said blocking sleeve has a coefficient of permeability that is less by at least three orders of magnitude than the coefficient of permeability of the housing material of said secondary cell.

15. The battery module according to claim 13, wherein said blocking sleeve is made of copper.

16. The battery module according to claim 1, wherein said induction coil is a wire coil or a braided coil.

17. The battery module according to claim 16, wherein said induction coil has two windings.

18. The battery module according to claim 1, wherein said induction coil is a conductor track of a flexible printed circuit board.

19. The battery module according to claim 18, wherein said induction coil is formed with two windings.

20. A hearing device, comprising a battery module according to claim 1.

* * * * *